United States Patent [19]

Siegel et al.

[11] Patent Number: 5,073,216
[45] Date of Patent: Dec. 17, 1991

[54] METHOD OF ULTRASONICALLY CUTTING FIBROUS MATERIALS AND DEVICE THEREFROM

[75] Inventors: Neal A. Siegel, Deerfield; Edward S. Tripp, Park City; Diane L. Aunet, Waukegan; Gradimir G. Georgevich, Mundelein, all of Ill.

[73] Assignee: Abbott Laboratories, Abbott Park, Ill.

[21] Appl. No.: 335,006

[22] Filed: Apr. 7, 1989

[51] Int. Cl.⁵ ............................................. B32B 31/18
[52] U.S. Cl. ................................. 156/73.3; 156/73.1; 156/580.1; 425/174.2; 162/9; 162/204; 162/207; 162/182
[58] Field of Search ...................... 156/515, 516, 73.1, 156/73.3, 73.4, 580.1, 580.2; 425/174.2; 310/323; 162/135, 204, 207, 182, 9; 428/500, 507, 508

[56] References Cited

U.S. PATENT DOCUMENTS

| | | | |
|---|---|---|---|
| 3,294,616 | 12/1966 | Linsley et al. | 156/580 |
| 3,666,599 | 5/1972 | Obeda | 156/73.1 X |
| 4,019,937 | 4/1977 | Holson | 156/73.1 |
| 4,025,374 | 5/1977 | Spindler et al. | 156/73.1 |
| 4,087,316 | 5/1978 | Jividen et al. | 162/65 X |
| 4,149,891 | 4/1979 | Sato et al. | 428/500 X |
| 4,244,762 | 1/1981 | Holson | 156/73.1 |
| 4,263,357 | 4/1981 | Holson | 428/138 |
| 4,410,383 | 10/1983 | Lipari | 156/73.1 |
| 4,605,454 | 8/1986 | Sayovitz et al. | 156/73.1 |
| 4,686,136 | 8/1987 | Homonoff et al. | 156/580.1 X |
| 4,693,771 | 9/1987 | Payet et al. | 156/515 X |
| 4,713,131 | 12/1987 | Obeda | 156/73.1 |
| 4,751,141 | 6/1988 | Fink et al. | 428/500 X |
| 4,756,884 | 7/1988 | Hillman et al. | 422/73 |
| 4,761,381 | 8/1988 | Blatt et al. | 436/165 |

FOREIGN PATENT DOCUMENTS

2395127  2/1979  France ................................. 156/73.3

*Primary Examiner*—David A. Simmons
*Assistant Examiner*—J. Sells
*Attorney, Agent, or Firm*—Frank S. Ungemach; Priscilla E. Porembski; Thomas D. Brainard

[57] ABSTRACT

A method for cutting fibrous materials using ultrasonic energy involves chemically modifying a fibrous material prior to the application of ultrasonic energy. Preferred fibrous materials include cellulose materials and its derivatives, such as, paper. Chemical modification includes oxidation or hydrolysis. Also disclosed is a test device made according to the method. The invention allows for the fusing of plastic and the simultaneous cutting of a chemically modified fibrous material along the line of fusion.

13 Claims, 2 Drawing Sheets

METHOD OF ULTRASONICALLY CUTTING FIBROUS MATERIALS AND DEVICE THEREFROM

BACKGROUND OF THE INVENTION

1. Field of the Invention

This invention relates to a novel use of ultrasonic energy to cut fibrous materials made of cellulose or its derivatives, such as paper; and to useful devices resulting from the novel method. More particularly, the invention relates to a method for cutting paper where the paper is first chemically modified, eg. by treating it with an oxidizing agent, and then is subjected to ultrasonic energy directed along a predetermined path or line.

2. Background

A. The Chemistry of Cellulose

Under controlled conditions oxidation has been used to decrease the chain length of the cellulose polymer. For example, standard chemistry texts such as Morrison and Boyd, *Organic Chemistry*, 4th Ed. (1983), pages 523 and 1113, teach that oxidation of 1,2-diols by periodic acid can reduce the chain length of the cellulose polymer from 1,500 or more glucose units to about 1,000 glucose units.

Paper consists of sheet materials that are composed of bonded small discrete fibers. Greater than 95% of this sheet material is fibrous and more than 90% of the material originates from wood. Of the remaining 10% of the sheet material, half comes from non-wood fibers such as cotton or flax (which are cellulosic in nature) and the other half is filler or pigment. The art of papermaking and the use of papermaking additives is disclosed in Kirk-Othmer, *Encyclopedia of Chemical Technology*, 3d Vol. 16 (1981), pp. 768-802 and 803-821, the teachings of which are incorporated herein. In paper making, chemical oxidative treatment may be used as a bleaching treatment to improve the brightness of the paper.

B. Ultrasound

Ultrasonic energy is typically produced by a piezoelectric transducer driven by a power supply. The transducers produce a repeating wave and can be coupled to the load (object being treated) either directly or through resonant members. Kirk Othmer, Encyclopedia of Chemical Technology, 3d Ed., Vol. 83, (1983) pages 462-479, incorporated herein by reference, presents a teaching of the workings and applications of ultrasonics. Basically, ultrasound produces compressional waves in the load. The propagation and absorption of these waves depend on the elastic and dissipative characteristics of the medium. In liquids and gases, only compressional waves are possible. In solids, however, the compressional waves can give rise to other variational modes such as shear, torsion or flexure.

Although ultrasound has a number of applications, its use in plastics welding is most relevant to the present invention. U.S. Pat. No. 3,666,599 (Obeda) discloses the use of a rotating anvil in an ultrasonic seaming apparatus ("welder") to form a seam between two layers of "textile fabrics which contain thermoplastic fibers". The rotating anvil which opposes the ultrasonic resonator, provides continuous zigzag and intermittent welds analogous to the stitching of a sewing machine.

U.S. Pat. No. 4,244,762 (Holson) discloses the use of ultrasonic energy to produce a plastic photographic album page comprising a fibrous material, such as paper, laminated between two sheets of ultrasonically weldable plastic. The Holson '762 lamination technique requires that enough energy be generated at the point of the weld to vaporize the paper. Thus Holson employs a discontinuous weld in order to permit the vaporized paper to vent. Further, Holson teaches that discontinuous stitching permits the fibrous lamina to be captivated without weakening its mechanical strength.

C. Devices

There are numerous devices on the market today employing plastic housings around fibrous materials. The diagnostic market alone abounds with such devices, used for example in chromatographic analyses. Many of these devices, however, are sophisticated and costly to manufacture. Simple devices such as dip sticks or paper chromatographs are available, but are generally directed towards simple tests, and are usually qualitative or semi quantitative, at best. They also encounter problems with contamination from external sources, and evaporation of reagent and sample fluids.

More sophisticated devices avoid these problems by employing a housing. Examples of such housings can be found in Wright in U.S. Pat. Nos. 3,915,647; Tom, et al., 4,366,241; Valkirs, et al., 4,632,901 and 4,727,019; and others.

Typically, housings known in the prior art have been molded of two components, the components being manually assembled to house the enclosed materials. Assembly may require special adhesives and adds to the cost of manufacture. Moreover, adhesives can contribute to instability. Often adhesives will give off volatile compounds (eg. ketones) which are detrimental to reagent stability.

SUMMARY OF THE INVENTION

This invention provides a novel method for cutting fibrous materials involving the application of ultrasonic energy to a chemically modified fibrous material along a selected line to effect the cutting. More specifically, a method of cutting of fibrous material comprising the steps of:

(a) chemically modifying the fibrous material by treating the fibrous material with an oxidizing agent or a hydrolyzing agent under conditions effective to render the material cuttable by ultrasonic energy; and (b) directing ultrasonic energy through the chemically modified fibrous material along a selected line of cut to effect cutting of the fibrous material.

A further method involves treating a fibrous material having a measurable, non zero elastic limit with an oxidizing or hydrolyzing agent under conditions sufficient to reduce the elastic limit of the fibrous material substantially to zero; followed by directing ultrasonic energy through the modified fibrous material to effect a cut.

A final further method comprises placing the modified fibrous material between first and second fusible materials, at least one of which includes means for defining a selected line of cut; and directing ultrasonic energy through the fusible materials and the modified fibrous material along the means for defining a selected line of cut to effect cutting of the modified fibrous material, while simultaneously fusing the fusible materials.

In another aspect, the invention relates to an article made according to the methods. Specifically, a shaped article comprises a fibrous material having a measurable, non-zero elastic limit treated with an oxidizing or hydrolyzing agent under conditions sufficient to reduce the elastic limit of the fibrous material substantially to zero, thereby rendering the material cuttable by ultrasonic energy, said material being shaped by directing ultrasonic energy through the modified fibrous material along a selected line of cut to effect shaping of the article.

Further articles include the modified fibrous article fused between two fusible materials to form a sandwich. Means for defining a selected line of cut may be associated with the fusible material to direct the ultrasonic energy and effect the cut.

In a final aspect, the invention provides a device for delivering a predetermined quantity of a fluid sample to a bibulous material. This device includes a housing defining a fluid flow path. At the beginning of the path is an internal capillary chamber of predetermined volume, the chamber having an inlet open to the exterior of the housing. Later in the path is a bibulous material capable of fluid transport and having a first portion in fluid communication with said chamber at an outlet point opposite said inlet. A second portion of the bibulous material is in fluid communication with the exterior of the housing at the end of the flow path. Thus, a predetermined quantity of fluid sample is measured in said capillary chamber before contacting and being drawn into said bibulous material. Preferably, reagent is disposed between the outlet of the capillary chamber and the first portion of the bibulous material.

DETAILED DESCRIPTION OF THE INVENTION

The invention relates to novel methods and articles resulting from the cutting of chemically modified fibrous materials using ultrasonic energy. The methods and articles of this invention encompass a wide variety of fibrous materials including natural fibers, synthetic fibers, and mixtures thereof. Natural fibers include fibers made from cellulose or its derivatives, such as, paper. Synthetic or manmade fibers include nylon, polyester, polyamines, and other well known polymer fibers. Textiles and fabrics are examples of fibrous materials containing mixtures of synthetic and natural fibers.

Cellulosic materials are preferred fibrous materials. These materials contain a natural carbohydrate high polymer (polysaccharide) consisting of anhydroglucose units joined by an oxygen linkage to form long molecular chains that are essentially linear. The degree of polymerization ranges from about 1,000 for wood pulp to about 3,500 for cotton fiber, giving a molecular weight from about 160,000 to about 560,000. The term "cellulosic" as used herein is defined as any of the derivatives of cellulose.

A most preferred fibrous material suitable for cutting using the method of the invention is paper. All types and compositions of papers known to the paper making art may be used. Examples of various types of papers include wood pulp paper, rag paper and paper containing mixtures of both. Rag paper typically is derived from cotton or flax fibers.

A. METHODS

Before the fibrous material can effectively be cut by ultrasonic energy it has been found necessary to chemically modify the fibrous material. Chemical modification may be accomplished by treating the fibrous material with an oxidizing or hydrolyzing agent. This treatment chemically alters the fibrous material rendering it cuttable by ultrasonic energy. Paper which has not been chemically modified will not be cut when ultrasonic energy is applied. Either the entire fibrous material or, alternatively, only the portion to be cut may be modified according to the invention.

Chemical modification by oxidation is preferably performed using perhalogen acids, perhalogenate salts, ozone, ozonides, or combinations thereof. Modification of the fibrous material by hydrolysis is preferably accomplished using an acid or a base. Preferred acids include phosphoric, sulfuric, nitric, hydrochloric and hydrobromic. Preferred bases include alkali metal hydroxides, such as potassium and sodium hydroxide. Concentration ranges for the oxidizing or hydrolyzing agents can be obtained from the examples which follow and are generally known in the art.

The exact mechanism of chemical modification is not fully understood. However, it is believed that the modification shortens and/or weakens the fibers of the fibrous material. Several parameters can be monitored to determine if the fibrous material is sufficiently modified to permit cutting by ultrasonic energy. These include the modification conditions, and the elastic limit and tensile strength of the modified material.

First, the conditions employed to perform the chemical modification can be repeated. The temperature may range from about 10° C. to about 60° C., preferably from about 20° to about 40° C. The method of contacting the oxidizing or hydrolyzing agent with the fibrous material is not believed critical and therefore any convenient method of contacting may be employed. It is preferred, however, that the fibrous material be washed free of excess agents after contact. This is conveniently performed by repeated washings with distilled water. After washing, the chemically modified fibrous material is dried, preferably at a temperature in the range from about ambient to about 50° C. The time period for chemical modification may range from about 1 to 24 hours, preferably from about 2 to 8 hours.

Alternatively, another measure of the appropriate time period for chemical modification is the change in the elastic limit of the fibrous material. The elastic limit of a material is defined as the smallest value of stress which can be applied to produce a permanent alteration. Oxidation or hydrolysis of fibrous materials will alter the material in a way that its elastic limit will decrease. As the elastic limit approaches substantially zero, stress is more likely to cause shear than a permanent elastic alteration in the material.

The ease with which the fibrous material can be cut using ultrasonic energy is directly proportional to the decrease in elastic limit. In other words, the higher the elastic limit of a given fibrous material, the more difficult (measured in either longer time or higher energy required) it will be to cut using ultrasonic energy.

Therefore, the time period required to perform the chemical modification of a fibrous material can be correlated with a measured change in elastic limit. Prior to chemical modification, a particular fibrous material will have a predetermined elastic limit greater than zero. Chemical modification should be sufficient (time and conditions) to result in a product material having an elastic limit of substantially zero. As used herein, reducing the elastic limit "substantially to zero" means reducing it to a level such that the material is rendered cuttable by the application of ultrasonic energy.

Although less preferred, another method for evaluating the sufficiency of chemical modification is to measure the tensile strength of the modified fibrous material. Tensile strength is defined as the greatest longitudinal stress the material can bear without tearing apart. Modification alters the material so that its tensile strength decreases. The ease with which the fibrous material can be cut using ultrasonic energy is directly proportional to the decrease in tensile strength. For a given paper, tensile strength may vary with the direction ("machining direction") in which the paper is rolled or formed during manufacture. For comparative purposes, unmodified S&S 410 paper was stressed in directions both parallel and perpendicular to the machining direction to give the following average results:

| Parallel | Perpendicular |
|---|---|
| 24.1 pounds | 10.79 pounds |

To perform the actual cutting, ultrasonic energy is directed through the chemically modified fibrous material. The particular method or apparatus in which the ultrasonic energy is directed through the modified fibrous material is not believed to be critical to the instant invention. It is preferred, however, that high power ultrasonic waves are used. Especially preferred are ultrasonic waves that have a frequency in the range of from about 10 to about 60 kHz, most preferably 15 to 30 kHz, and a power in the range of from about 100 to about 2,000 watts, most preferably 500 to 2,000. The length of time that the ultrasonic energy is directed to the modified fibrous material, as well as the level of power and frequency, will vary depending upon the physical and chemical characteristics of the modified fibrous material to be cut.

B. ARTICLES

Preferred articles made according to the novel methods include fibrous materials supported on or "sandwiched" between first and second fusible materials prior to and during the application of ultrasonic energy.

The fibrous materials used in articles according to the invention, and methods of modifying them are described in the previous section. In the preferred embodiments which follow, the fibrous material is also a bibulous material, though this is not necessarily the case for all articles of the invention.

A preferred fusible material is plastic. "Plastic" as used herein, is defined as any high polymer, usually synthetic, combined with other ingredients, such as curatives, fillers, reinforcing agents, colorants, plasticizers, etc. Fusible plastics include amorphous or crystalline thermoplastic resins. "Amorphous thermoplastic resins" include acetylene-butadiene-styrene (ABS), ABS polycarbonate alloy, acrylic, acrylic multi polymer, cellulose acetate, phenylene oxide, polyamides, polyimide, polycarbonate, polystyrene, polysulfone, polyvinyl chloride and combinations thereof. "Crystalline thermoplastic resins" include acetal, fluoropolymer, nylon, thermoplastic polyester, polyethylene polymethylpentane, poly(phenylene sulfide), polypropylene, and combinations thereof.

It is often preferred that at least one of the ultrasonically fusible materials include a transparent portion so the fibrous material can be viewed directly. Such an arrangement permits the enclosure of paper and other fibrous materials into the fusible housings. Although many types of devices and articles fall within the scope of the invention, a particularly preferred embodiment—a test device—is described herein, in conjunction with the drawings.

While attempting to solve contamination and evaporation problems with prior test devices, it was unexpectedly discovered that a test device 10 (See FIG. 1), comprising bibulous material 16 sandwiched between fusible plates 12 and 14, could be conveniently assembled without precutting the bibulous material. In particular, it was discovered that if a bibulous material, such as paper, was oxidized before being sandwiched between ultrasonically fusible plates, portions of the oxidized paper which overlapped the proposed line of fusion, would be cut off by the ultrasonic energy applied along the energy directors during the fusing operation. In contrast, paper which had not been previously oxidized was not cut by the application of ultrasonic energy along the line of fusion.

Figure 1:
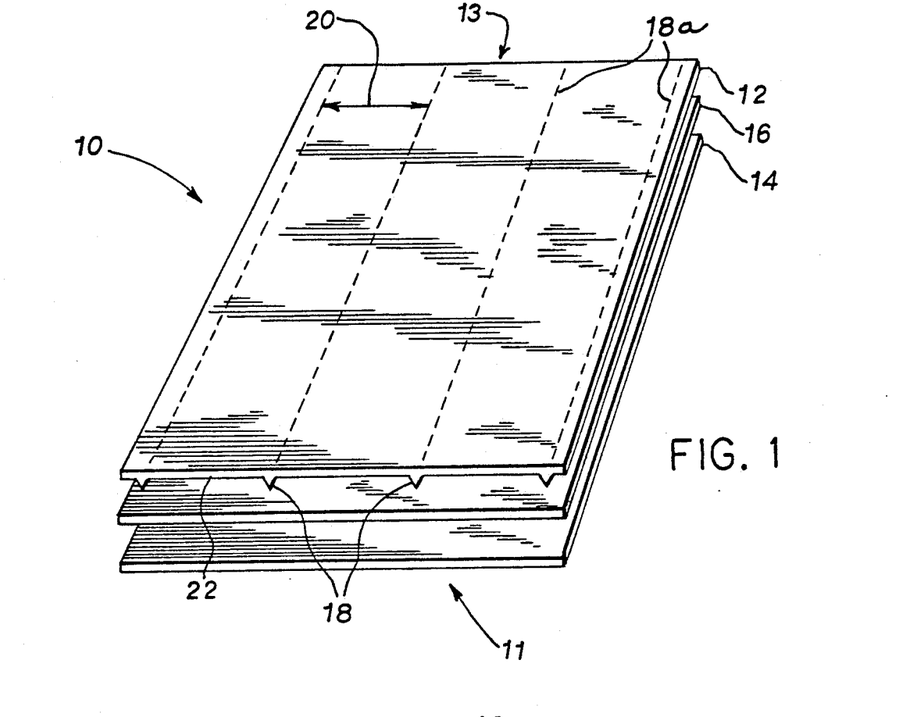
FIG. 1 is a perspective view of the components of a flow path device prior to ultrasonic welding.

By predetermining the line of fusion for the ultrasonically fusible plates 12 and 14, the line of cut for the ultrasonically cuttable bibulous material is likewise determined. For example, it is well known in the art of "ultrasonic welding" that a line of fusion can be controlled by molding a "v" shaped ridge 18 ("energy director" or "del") on one of the surfaces of a sheet or plate (hereinafter "plate") to be fused. The energy director serves to concentrate the energy along its ridge line. In a typical cutting/fusion operation, a plastic plate is layered over another plastic plate such that the energy director(s) on one of the plates are facing the opposite layered plate. The apex of the del ridge 18 should be spaced from the opposing plate only by the bibulous material 16.

Figure 2A:
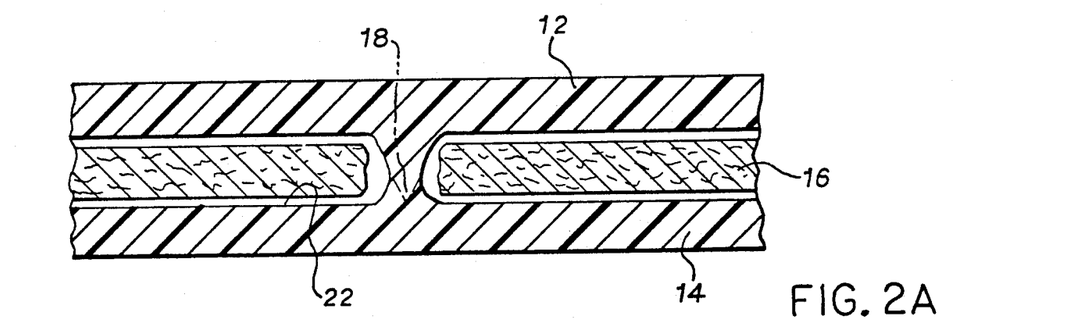
FIGS. 2A and 2B provide enlarged cross-sectional views of the weld and the ultrasonically severed fibrous material.
Figure 2B:
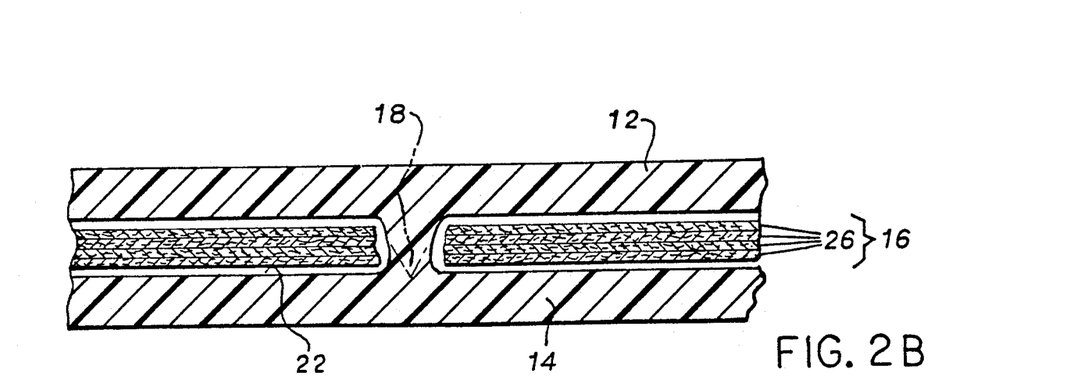

As shown in FIG. 2A, when ultrasonic energy is applied along the base of the energy director 18, it is focused at the apex of the energy director and severs the ultrasonically cuttable bibulous material 16 while fusing the top plate 12 to the opposite plate 14 at the point of the energy director 18 to form the weld zone. Thus, in one operation the ultrasonic energy severs and isolates a segment of the bibulous material 16 by creating a weld zone between the severed portions. FIG. 2B shows an equivalent weld zone cutting and isolating a bibulous material 16 consisting of a plurality of layers 26. Multiple layers may be useful for separation of incompatible reagents, or controlling flow of fluids through the bibulous material. It is possible to delay mixing of reagents with sample or other reagents by employing an impervious layer 26 between the sample/reagent layers.

Test devices according to the present invention can be used for either identifying or quantitating an analyte of interest from a biological sample, employing conventional immunoassay (sandwich or competitive) binding chromatographic techniques, as are well known in the art. These techniques are known in the art. See, for example, Zuk, et al. U.S. Pat. No. 4,435,504, Deutsch, et al. U.S. Pat. Nos. 4,094,647, 4,235,601 and 4,361,537, and EP A 0 088 636, which are herein incorporated by reference.

Biological sample is preferably a fluid sample from a biological source. This includes, without limitation, whole blood, serum, plasma, urine, saliva, cerebrospinal fluid (CSF), amniotic fluid, tissue extracts, and concentrates or dilutions thereof. It is also possible to employ a sample in conjunction with a wicking solution to move the sample along the flow path. By "wicking solution" is meant a solvent mix or solution of sufficient polarity and/or pH to render the analyte of interest capable of migrating on the bibulous material.

Figure 4:
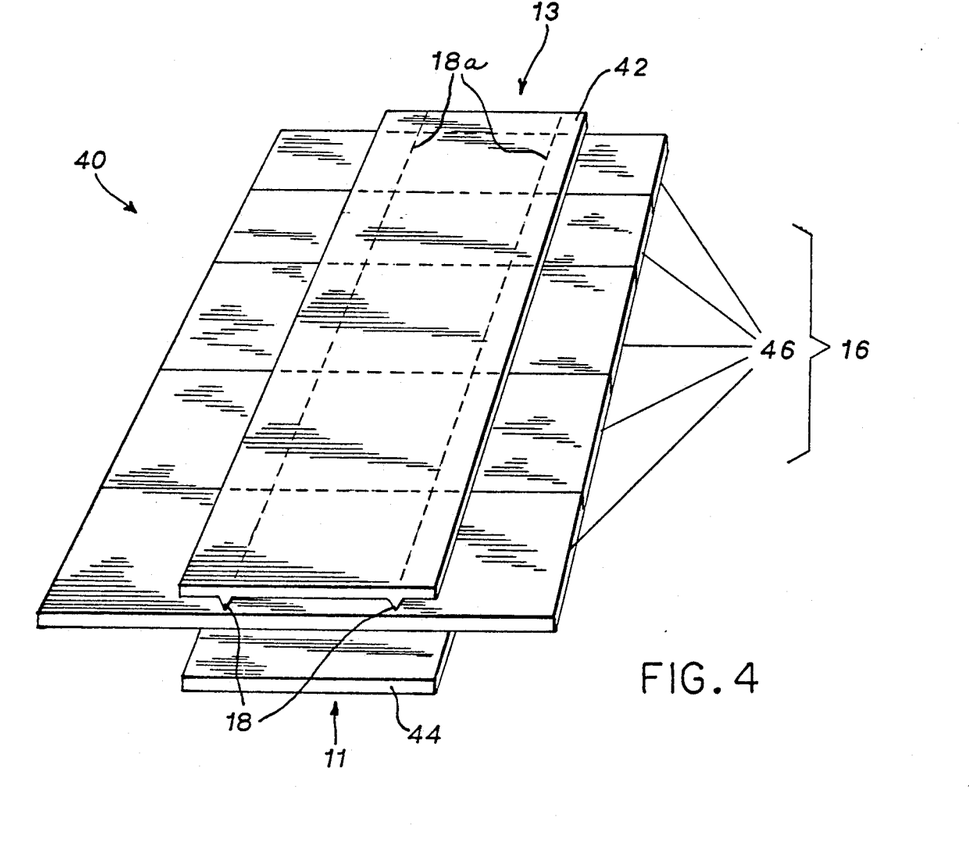
FIG. 4 provides a perspective view of the components of a single path, multi-zone device of the present invention, prior to ultrasonic welding.

A test device according to the invention may comprise a single flow path or multiple flow paths, each defined by the isolation of a bibulous material on both lateral edges. A single flow path is formed by two non intersecting energy directors as shown in FIG. 4. As shown in FIG. 1, multiple (n) flow paths 20 are formed by multiple (n+1) del ridges 18. A multiple flow path device may be used to simultaneously analyze a sample fluid for a plurality of analytes, or to perform replicates on a single sample.

Each flow path occupies a flow channel 22 bounded on top and bottom by the plates 12 and 14. The width of the flow channel 22 is defined by the spacing between the energy directors 18. The length of the flow channel is determined by the plates 12 and 14. The height of the flow channel 22 is determined by the weld characteristics and the pressure with which plate 12 is held to plate 14. It is preferable to select weld characteristics and bibulous materials so as to avoid any gaps (see FIGS. 2A and 2B) between the bibulous material and the plates 12 and 14. The flow path 20 is defined to be the channel 22 in combination with the bibulous material 16 occupying the channel. Eliminating the gap reduces the chance of creating flow path external to the bibulous material.

It is presently preferred that the energy directors be parallel so that the flow path is uniform in width. Nevertheless, other configurations are also possible including gradually increasing or decreasing widths and step wise width changes. These configurations may be employed to control or regulate fluid flow along the flow path.

Figure 3:
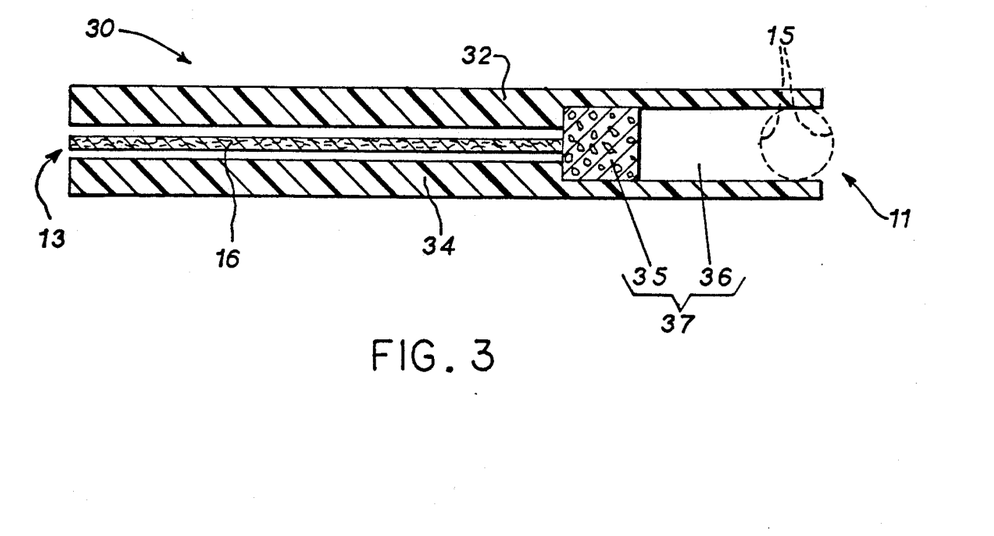
FIG. 3 is a longitudinal cross-sectional view of a volume chamber embodiment of the present invention.

In another embodiment, shown in FIG. 3, a volumetric capillary device 30 is shown having a plate 32 and a plate 34 joined together, preferably by ultrasonic fusing, to form a housing. At the proximal end 11, a volumetric chamber 37 is formed in the plates 32 and/or 34. The chamber 37 includes a capillary gap area 36 and a porous frit 35. The gap 36 is configured so that contacting the proximal end 11 with a drop of a sample or sample solution will produce a droplet in the gap. The gap is selected based upon the viscosity and other characteristics of the sample fluid. The droplet is maintained by its own surface tension forces as defined by the menisci 15. As additional drops are added, the gap 36 fills until the porous frit is contacted. At this point a predetermined volume (defined by the chamber gap) of sample or sample solution has entered the device. The gap volume is predetermined to hold a sufficient quantity of sample to complete the assay, and is based on the capacity of the bibulous material 16, and the particular analyte.

The porous frit contains reagents necessary for performing the assay; for example, glucose oxidase and peroxidase for a glucose assay, or cholesterol esterase, cholesterol oxidase and peroxidase for a cholesterol assay. Signal generation systems may be present in the frit or on the bibulous material 16. For blood samples, the frit may also contain agglutinating agents as taught in co owned and copending application Ser. No. 335,064, entitled METHODS AND DEVICES FOR THE SEPARATION OF PLASMA OR SERUM FROM WHOLE BLOOD, filed on even date herewith and incorporated by reference. The frit may comprise glass fibers, sintered materials or other porous media.

As the meniscus 15 contacts the frit 35, the capillary forces of the frit and the bibulous material overcome the surface tension of the meniscus and the fluid begins capillary transport. Thus, no reagents are contacted by sample and no reaction begins until a sufficient predetermined quantity of sample fluid has been admitted to the device 30.

FIG. 4 presents an embodiment 40 of the present invention wherein several zones are created along each flow path. The bibulous material 16 in this case comprises two or more strips 46 butted side by side and laid perpendicular to longitudinal lines 18a created by the energy directors 18. Because the strips 46 are butted end to end, they provide a "multi zoned" capillary bed wherein each strip 46 constitutes a "zone" through the sample wick. The zones may vary from one another as to density, composition and presence of reagents, or any combination of these characteristics. In FIG. 3, for example, the frit 35 is butted adjacent the bibulous material. Thus, an advantage of the present invention is realized, whereby dissimilar materials, for example glass fibers and paper, can be butted together in liquid receiving relationship without the use of adhesives.

Multizone devices can be used qualitatively or quantitatively to determine analytes in sample fluids much like single zone devices. The use and advantages of multizone devices are described, for example, in Freisen, DE 3 445 816 (Behrinqwerke, AG).

It is within the scope of the present invention that the test devices include a means for receiving a sample at one end 11 of the test device, hereinafter the "proximal" end. Various means for receiving a sample are well known in the art. For instance, the bibulous material 16 may be exposed at the proximal end 11 allowing the device to be dipped in the sample solution. Alternatively, one of the ultrasonically fusible plates may contain a hole or slit (not shown) for the application of a test sample or solution to the bibulous material. The capillary chamber of FIG. 3 is another sample receiving means. Optionally, the application of a test sample or solution may be followed by the further application of a wicking solution. In yet another embodiment (not shown), the proximal end of one of the ultrasonically fusible plates may contain a reservoir for containing and transferring the test sample or solution to the bibulous material and/or transferring a wicking solution after application of the test sample or solution.

Test devices should also include at a distal end 13 a means for venting air from the flow channel 22 as fluid wicks up the flow path. The means for venting may be any orifice through which air may escape. Typically, the distal end would be unfused allowing air to vent through the slit remaining at the distal end of flow channel 22. However, for greater protection from contamination, the distal end 13 may be fused (not shown) provided that one or more holes (not shown) suitable for venting be provided at the distal end of each flow channel 22. Such holes could be in either plate member 12 or 14.

To demonstrate the attendant advantages arising from the present method and articles, the following examples are set forth. It is to be understood that the examples are illustrative only and are not intended as an undue limitation on the scope of the invention, as defined in the claims.

EXAMPLE I

This example presents a preferred method of chemically modifying a fibrous material. A 10 g sample of Schleicher & Schuell (S&S) 410 filter paper (6"×6" sheets) was added to a beaker containing 10 g sodium metaperiodate in 200 ml of distilled water, and was shaken for 8 hours on a rotary shaker. Samples of the paper were removed at intervals of 2, 4 and 8 hours. Each sample was water washed for 2 hours in repeated changes of distilled water to remove any excess sodium metaperiodate. The washed samples were then dried at ambient temperatures before being cut into one inch (1") strips. An untreated paper sample was prepared as a control.

Both the untreated paper and paper treated by the method of this invention were tested for tensile strength, elastic limit and shear strength using an Instron, Model No. I768/H9064. The machine was set at five inches per minute (5"/min) chart speed and ten pounds (10 lbs) full scale measurement. Papers were stressed in a direction perpendicular to the machining direction. The average values obtained using 5–13 individual samples for each treatment are given in Table I.

TABLE I

| Oxidation Time (hrs) | 0 | 2 | 4 | 8 |
|---|---|---|---|---|
| Tensile Strength[1] (lbs) | 7.9 | 6.3 | 6.3 | 4.9 |
| Elastic Limit[2] (lbs) | 6.9 | 5.9 | 0 | 0 |
| Time for Shear[3] (sec) | 3 | 1.6 | 1.1 | 0.8 |

[1]Tensile Strength is defined as the greatest longitudinal stress a substance can bear without tearing apart.
[2]Elastic Limit is defined as the smallest value of stress which can be applied to produce a permanent alteration.
[3]Time for Shear is defined as the time required for an item being stretched along its longitudinal axis (length) to tear along its latitudinal axis (width).

As confirmed by this data, tensile strength, elastic limit and shear time all decrease the longer the paper remains in contact with the oxidizing agent. After four hours of treatment, when the elasticity is zero, shearing the treated paper takes only 38% of the time required to sheer untreated paper, and the tensile strength of the treated paper is only 78% of the tensile strength of untreated paper.

EXAMPLE II

In this example, S&S 410 paper modified for 8 hours according to Example I was cut using a Branson Ultrasonics 900 M Series microprocessor controlled 20 kHz ultrasonic welding system with a 1,000 watt power supply.

A piece of the chemically modified paper was placed between two sheets of polystyrene plastic and the entire assembly was placed between the horn and fixture of the welding system. The upper sheet of polystyrene plastic was flat and white. The lower sheet of plastic was clear and had an energy director (or del) rising from its surface. Polystyrene plastic was chosen in this example because it is easily welded. Application of ultrasonic energy causes the plastic to melt and fuse together along the line of the energy director.

The experimental parameters included a weld time of 65 milliseconds (ms), peak power of 72.5%, power supply rated at 1,000 watts, head pressure of 75 psig, trigger pressure of 100 pounds and hold time (melt and cool) of 75 ms. Application of ultrasonic energy cleanly cut the paper fibers of the modified paper, but not the untreated paper.

As evidence of complete cutting, the white lower plastic layer was clearly visible through the clear plastic in the weld zone. If the paper had not been cut, the white layer would not be visible. No traces of rose colored fibers were observed in the weld zone. Furthermore, when fluid was added to the paper on one side of the weld zone it did not cross to the other side. Although the application of ultrasonic energy fused the two plastic layers together, upon separation, the paper sandwiched in between exhibited distinct boundaries at the weld zone.

As a control, the above experiment was repeated under the same conditions using untreated paper. The white plastic layer was not visible through the clear plastic layer thus evidencing that the paper was not cut. Further, when fluid was added to one side of the weld zone it wicked across to the other side. Although the paper fibers were not cut, the plastic sheets did adhere to each other. This is attributable to plastic flowing through and between the paper fibers, not to a severing of the fibers.

A confirmation of the visual observation that the chemically modified paper was indeed ultrasonically cut was obtained from a recording of peak power verses time. When the paper modified in accordance with this invention was tested, two distinct power peaks were observed at 30 ms and at 60 ms. When untreated paper was evaluated, only a single broad peak was observed. The test was repeated, but no paper was placed between the two plastic sheets. A single power peak was observed at 60 ms. On the basis of these experiments, the power peak at 30 ms is believed to represent the power required to effect the ultrasonic cutting of the paper fibers, and the power peak at 60 ms reflects the welding of the two plastic layers.

EXAMPLE III

This example demonstrates the ultrasonic cutting of several different types of cellulosic materials. The chemical modification described in Example I was performed on multiple samples of standard newsprint, graph paper and xerography paper. The tensile strength was measured in an Instron instrument as in Example I. The tensile strength relative to untreated papers of the same type are given in Table II.

TABLE II

| Oxidation Time (hrs) | 0 | 2 | 4 | 8 |
|---|---|---|---|---|
| Relative Tensile Strength for: | | | | |
| Newsprint | 1.0 | 0.63 | 0.36 | 0.31 |
| Graph Paper | 1.0 | 0.93 | 0.42 | 0.49 |
| Xerography Paper | 1.0 | 0.72 | 0.58 | 0.32 |

Thus, increasing chemical modification times lead to increased cuttability as shown by the decrease in relative tensile strength.

Samples of the various papers treated as above were also subjected to ultrasonic energy along a preselected line (see Example II) with the following results:

TABLE III

| Oxidation Time (hrs) | 0 | 2 | 4 | 8 |
|---|---|---|---|---|
| Ultrasonic Cuttability for: | | | | |
| Newsprint | No | Yes | Yes | Yes |
| Graph Paper | No | No | Yes | Yes |
| Xerography Paper | No | Yes | Yes | Yes |

While the preceding examples demonstrate specific embodiments of the invention, it is to be understood that the examples are illustrative only and are not intended as an undue limitation on the scope of the invention, as defined in the claims.

What is claimed is:

1. A method of cutting of fibrous material comprising the steps of:
   (a) chemically modifying the fibrous material by treating the fibrous material with an oxidizing agent or a hydrolyzing agent under conditions effective to render the material is cuttability by ultrasonic energy facile; and
   (b) directing ultrasonic energy through the chemically modified fibrous material along a selected line of cut.

2. A method according to claim 1 wherein the fibrous material comprises cellulosic material.

3. A method according to claim 2 wherein the cellulosic material comprises paper.

4. A method according to claim 1 wherein the agent is selected from the group consisting of perhalogen acids, perhalogenate salts, ozone, and ozonides.

5. A method according to claim 1 wherein the hydrolyzing agent is an acid selected from the group consisting of phosphoric acid, sulfuric acid, nitric acid, hydrochloric acid and hydrobromic acid.

6. A method according to claim 1 wherein the hydrolyzing agent comprises an alkali metal hydroxide.

7. A method according to claim 1 wherein the ultrasonic energy comprises a high power ultrasonic wave of from about 100 to about 2,000 watts and having a frequency in the range of from about 10 to about 60 kHz.

8. A method according to claim 7 wherein the ultrasonic energy comprises a high power ultrasonic wave of from about 500 to about 2,000 watts and having a frequency in the range of from about 15 to about 30 kHz.

9. A method according to claim 1 wherein step (a) comprises treating a fibrous material having a measurable, non-zero elastic limit with an oxidizing or hydrolyzing agent for a length of time sufficient to reduce the elastic limit of the fibrous material substantially to zero.

10. A method according to claim 1 wherein step (b) further comprises:
    (a) placing the modified fibrous material between first and second fusible materials, at least one of which includes means for defining a selected line of cut; and
    (b) directing ultrasonic energy through the fusible materials and the modified fibrous material along the means for defining a selected line of cut to effect cutting of the modified fibrous material, while simultaneously fusing the fusible materials.

11. A method according to claim 10 wherein at least one of the first and second fusible materials comprises a plastic.

12. A method according to claim 10 wherein the means for defining a selected line of cut comprises one or more dels.

13. A method according to claim 10 wherein the fibrous material comprises at least two dissimilar substances which are fused one abutting the other between the first and second fusible materials.

* * * * *

UNITED STATES PATENT AND TRADEMARK OFFICE
CERTIFICATE OF CORRECTION

PATENT NO. : 5,073,216

DATED : Dec. 17, 1991

INVENTOR(S) : Neal A. Siegel, Edward S. Tripp, Diane L. Aunet, Gradimir G. Georgevich It is certified that error appears in the above-identified patent and that said Letters Patent is hereby corrected as shown below:

Column 2, line 19
Delete "semi quantitative" and insert --semi-quantitative--

Column 2, line 52
Delete "non zero" and insert --non-zero--

Column 5, line 68
Delete "ABS polycarbonate" and insert --ABS-polycarbonate--

Column 8, line 5
Delete "co owned" and insert --co-owned--

Column 8, line 24
Delete "multi zoned" and insert --multi-zoned--

Column 11, line 25
Delete "material is" and insert --material's--

UNITED STATES PATENT AND TRADEMARK OFFICE
CERTIFICATE OF CORRECTION

PATENT NO. : 5,073,216

DATED : Dec. 17, 1991

INVENTOR(S) : Neal A. Siegel, Edward S. Tripp, Diane L. Aunet, Gradimir G. Georgevich It is certified that error appears in the above-indentified patent and that said Letters Patent is hereby corrected as shown below:

Column 11, line 35, Delete "the agent" and insert --the oxidizing agent --.

Signed and Sealed this

Fourteenth Day of September, 1993

Attest:

BRUCE LEHMAN

*Attesting Officer*  *Commissioner of Patents and Trademarks*